United States Patent

Friese et al.

[11] Patent Number: 6,096,842
[45] Date of Patent: *Aug. 1, 2000

[54] AEROBICALLY CURABLE ADHESIVE

[75] Inventors: Carsten Friese, Hamburg; Frank Bergmann, Hannover, both of Germany

[73] Assignee: Henkel Kommanditgesellschaft auf Aktien, Duesseldorf, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/875,394

[22] PCT Filed: Jan. 18, 1996

[86] PCT No.: PCT/EP96/00199

§ 371 Date: Jul. 24, 1997

§ 102(e) Date: Jul. 24, 1997

[87] PCT Pub. No.: WO96/23036

PCT Pub. Date: Aug. 1, 1996

[30] Foreign Application Priority Data

Jan. 24, 1995 [DE] Germany ............. 195 01 933

[51] Int. Cl.[7] ........................................ C09J 4/00
[52] U.S. Cl. .................. 526/109; 526/110; 526/111; 526/112; 526/213; 526/216; 156/327; 156/332
[58] Field of Search ..................... 156/327, 332; 526/109, 110, 111, 112, 213, 216

[56] References Cited

U.S. PATENT DOCUMENTS

| | | | |
|---|---|---|---|
| 4,052,244 | 10/1977 | Skoultchi | 156/310 |
| 4,321,349 | 3/1982 | Rich | 526/270 |
| 4,439,600 | 3/1984 | Moran, Jr. | 528/392 |
| 5,268,436 | 12/1993 | Huver et al. | 526/216 |
| 5,354,821 | 10/1994 | Huver et al. | 526/147 |

FOREIGN PATENT DOCUMENTS

| | | |
|---|---|---|
| 0 079 703 | 5/1983 | European Pat. Off. . |
| 0 356 875 | 3/1990 | European Pat. Off. . |
| 0 358 033 | 3/1990 | European Pat. Off. . |
| 33 20 918 | 12/1983 | Germany . |
| 44 41 463 | 6/1995 | Germany . |
| 2 121811 | 1/1984 | United Kingdom . |
| WO86/01153 | 2/1986 | WIPO . |
| WO88/08868 | 11/1988 | WIPO . |

*Primary Examiner*—Frederick Krass
*Attorney, Agent, or Firm*—Wayne C. Jaeschke; Stephen D. Harper

[57] ABSTRACT

Aerobically hardening adhesives based on polymers of acrylates or methacrylates having a relatively high boiling point such as polyurethane (meth)acrylates are described, wherein the adhesives contain at least one initiator capable of forming free radicals, at least one accelerator, and at least one siccative. Such adhesives are largely odorless and harden completely such that the adhesive surface at the boundary with air is not tacky.

22 Claims, No Drawings

AEROBICALLY CURABLE ADHESIVE

This application is a 371 of PCT/EP96/00199, filed Jan. 18, 1996.

This invention relates to an acrylate- or methacrylate-based aerobically curable adhesive which contains at least one radical-forming initiator and at least one accelerator.

BACKGROUND OF THE INVENTION

Acrylate-based adhesives of the type in question are known. Thus, DE 33 20 918 describes a two-component acrylate adhesive in which the first component consists of the following constituents: urethane/acrylate block resin, hydroxyethyl methacrylate, cumene hydroperoxide, 1-acetyl-2-phenyl hydrazine, benzene sulfimide, acrylic acid and chelator. The second component consists of the following constituents: urethane/acrylate block resin, hydroxyethyl methacrylate, copper octoate and a chelator. The two components are mixed in a ratio by volume of 1:1. A stable bond is formed after 20 seconds. The following comments are made on the transition metal accelerator (page 19, lines 16 et seq.): "Transition metal accelerators are preferably a salt or complex of copper, nickel, cobalt or iron. Preferred examples of these accelerators are copper octoate, copper naphthenate, copper ethyl hexanoate and copper acetyl acetonate and others." The disadvantage of this known adhesive is its pungent odor. In addition, although rapid exothermic polymerization is observed, a surface-tacky polymer is obtained, particularly where the adhesive is present as a thin film with a thickness of 0.1 to 0.2 mm. If the adhesive layer is even thinner, the polymerization is inhibited by oxygen.

Accordingly, the problem addressed by the present invention was to provide an adhesive which would not have these disadvantages, i.e. would be substantially odor-free and would cure so completely that its surface at the boundary with the surrounding air would not be tacky.

BRIEF DESCRIPTION OF THE INVENTION

The solution provided by the invention is defined in the claims and consists essentially in the use of acrylates and/or methacrylates with a boiling temperature of at least 120° C. at normal pressure and also in the use of at least one drying agent or drier.

The adhesive according to the invention is based on acrylates and/or methacrylates, i.e. the reactive component consists predominantly—by weight—of an ester of acrylic acid and/or methacrylic acid. Other reactive components, for example copolymerizable allyl or vinyl compounds, may also be present. Suitable acrylic or methacrylic acid esters are confined to those having a relatively high vapor pressure at room temperature. In very approximate terms, the esters in question are compounds with a boiling point above 120° C. and preferably above 150° C. at normal pressure.

The acrylates or methacrylates may contain one or more reactive double bonds. The alcohol radical may contain hetero atoms, for example in the form of ether, alcohol, carboxylic acid, ester and urethane groups.

One important class of acrylates or methacrylates are the polyurethane (meth)acrylates (PUMA). These may be compounds corresponding to general formula (II):

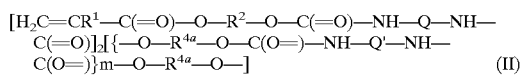
(II)

in which:

m=0 to 10, $R^1$=hydrogen or a methyl group, $R^2$=a linear or branched alkyl group containing 2 to 6 carbon atoms or an alkylene oxide containing 4 to 21 carbon atoms, Q and Q' independently of one another are aromatic, aliphatic or cycloaliphatic groups containing 6 to 18 carbon atoms which are derived from the basic diisocyanate or diisocyanate mixtures and $R^{4a}$ is derived from a polyester diol with a C:O ratio of >2.6, a C:H ratio of <10 and a molecular weight in the range from 1,000 to 20,000.

The composition may additionally contain one or more radical-polymerizable compounds (A) and/or (B) corresponding to the following general formula:

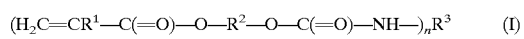
(I)

in which:

$R^1$=hydrogen or a methyl group, $R^2$ is a linear or branched alkyl group containing 2 to 6 carbon atoms or an alkylene oxide containing 4 to 21 carbon atoms and n=1, 2 or 3, (A) $R^3$ for n=1 is an acrylic group containing 6 to 18 carbon atoms.

a linear or branched alkyl group containing 1 to 18 carbon atoms or a cycloalkyl group containing 3 to 12 carbon atoms, (B) $R^3$ for n=2 is

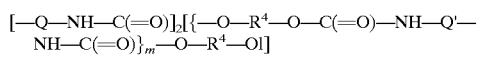

where m=0 to 10 and $R^4$ is a) a polycaprolactone diol unit b) a polytetrahydrofurfuryl diol unit or, where n=3, $R^3$ is

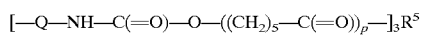

where $R^5$ is a triol residue of a linear or branched trihydric alcohol containing 3 to 6 carbon atoms and p=1 to 10 and Q and Q' independently of one another represent aromatic, aliphatic or cycloaliphatic groups containing 6 to 18 carbon atoms derived from diisocyanates or diisocyanate mixtures.

One or more (meth)acrylate comonomers (C) containing no urethane groups may be additionally used. The percentage contents of the reactive compounds A, B and C in the adhesive are as follows:

0 to 80% by weight of one or more compounds (B) and 100 to 20% by weight of one or more compounds (A) or 100 to 20% by weight of a mixture of one or more of compounds (A) and (C) or 2 to 80% by weight of one or more compounds (B) and 98 to 20% by weight of one or more compounds (C), based on the total quantity of (A)+(B)+(C).

The compounds corresponding to formula (I) may be obtained in known manner by reaction of an acrylate ($R^1$=H) or methacrylate ($R^1$=CH$_3$) containing hydroxyl groups in the ester group with compounds containing isocyanate groups to form a urethane group. The hydroxyalkyl acrylates or methacrylates contain alkyl groups which may be linear or branched and which contain between 2 and 6 carbon atoms. According to the invention, the esters of acrylic acid and methacrylic acid with polyethylene glycol and/or polypropylene glycol may also be used. Corresponding acrylates or methacrylates contain 4 to 21 carbon atoms in the ester group corresponding to 2 to 10 ethylene oxide units and 1 to 7 propylene oxide units. The production of these esters is familiar to the expert.

Component (A):

Urethane (meth)acrylates corresponding to formula (I) with n=1 are known and may be obtained in known manner from the basic isocyanates by reaction with the corresponding hydroxyfunctional (meth)acrylates corresponding to the following general formula:

$$H_2C=CR^1—C(=O)—O—R^2—OH$$

Relevant processes are described in WO 86/01153 or U.S. Pat. No. 4,439,600. Suitable acrylates or methacrylates are those for which $R^2$ contains an ethylene, propylene, isopropylene, n-butylene or isobutylene group or 4 to 7 ethylene oxide or propylene oxide units.

However, hydroxyethyl acrylate, hydroxyethyl methacrylate, 2-hydroxypropyl acrylate, 2-hydroxypropyl methacrylate, 3-hydroxypropyl acrylate, 3-hydroxypropyl methacrylate, 6-hydroxyhexyl acrylate, 6-hydroxyhexyl methacrylate, polyethylene glycol acrylate, polyethylene glycol methacrylate, polypropylene glycol acrylate and polypropylene glycol methacrylate are preferred for the reaction of the isocyanates with the hydroxyfunctional acrylates or methacrylates. The linear or branched alkyl groups containing 1 to 8 carbon atoms for $R^3$ are, in particular, methyl, ethyl, propyl, isopropyl, n-butyl, isobutyl, tert.butyl, pentyl, isopentyl, neopentyl or hexyl groups.

The cycloalkyl groups containing 3 to 12 carbon atoms are preferably selected from the group consisting of cyclopropyl, cyclobutyl, cyclopentyl, cyclohexyl and cycloheptyl. Aromatic groups containing 6 to 18 carbon atoms are, in particular, the phenyl, 2-toluenyl, 4-toluenyl and xylenyl groups which are introduced by reaction of the hydroxyfunctional (meth)acrylates with the corresponding isocyanates.

Component (B):

The compounds corresponding to general formula (I) with n=2 are reaction products of the above-mentioned hydroxyfunctional acrylates or methacrylates with isocyanates which are obtainable by reaction of suitable diols with diisocyanates. The diols are a) polycaprolactone diols, b) polytetrahydrofurfuryl diols and c) special polyester diols. The molar ratio in the reaction of the diols with the diisocyanates may vary from 1:2 to 1:1.1.

a) Polycaprolactone diols may be obtained in known manner by ring-opening polymerization of caprolactone with suitable diols, the ratio of caprolactone to diol being 1 to 20:1, i.e. 2 to 40 moles of caprolactone are used per mole of diol. The molar weight of the polycaprolactone diols is between 200 and 4,000. Suitable diols are, in particular, linear or branched dihydric alcohols containing 2 to 6 carbon atoms selected from ethylene glycol, propane-1,2-diol, propane-1, 3-diol, butane-1,2-, -1,3- or -1,4-diol, pentane-1,5-diol, 2-methylbutane-1,4-diol, 2,2-dimethylpropane-1,3-diol, hexane-1,2- or -1,6-diol, decane-1,10-diol.

The reaction products of the diol and the caprolactone are then reacted with aromatic, aliphatic or cyclic diisocyanates by methods known to the expert. Suitable diisocyanates from which Q and—independently—Q' are derived are selected from 2,4-toluene diisocyanate, 2,6-toluene diisocyanate, 4,4'-diphenyl methane diisocyanate (MDI), 4,4'-dicyclohexyl diisocyanate, m- and p-tetramethyl xylene diisocyanate, 3-isocyanatomethyl-3,5,5-trimethyl cyclohexyl isocyanate (isophorone diisocyanate), hexamethylene diisocyanate, 1,5-naphthylene diisocyanate, dianisidine diisocyanate, di-(2-isocyanatoethyl)-bicyclo[2.2.1]hept-5-ene-2,3-dicarboxylate, 2,2,4- and 2,4,4-trimethylene hexamethylene diisocyanate and mixtures thereof.

The reaction product of the diol, the caprolactone and the diisocyanate are then reacted with the hydroxyfunctional acrylate or methacrylate by methods known per se to form the polyurethane (meth)acrylate.

b) The compounds (B) derived from polytetrahydrofurfuryl diol are synthesized in basically the same way as described in a). Polytetrahydrofurfuryl diol is first reacted with one of the diisocyanates mentioned above under a) and the resulting reaction product is reacted with the hydroxyfunctional acrylates or methacrylates already mentioned in a) to form the polyurethane (meth)acrylate. Particulars of the process for reacting diols with diisocyanates can be found in the relevant specialist literature known to the expert. The molecular weight of the products is in the range from 200 to 4,500.

c) Particularly favorable properties, particularly in regard to hydrophobicization, are obtained through the use of the above-mentioned polyurethane (meth)acrylates corresponding to general formula (II) based on special polyester diols. These polyurethane (meth)acrylates have a particular elasticizing effect. They are compounds corresponding to general formula (II):

$$[H_2C=CR^1—C(=O)—O—R^2—O—C(=O)—NH—Q—NH—C(=O)]_2[\{—O—R^{4a}—O—C(O=)—NH—Q'—NH—C(O=)\}_m—O—] \quad (II)$$

in which $R^1$, $R^2$, Q, Q' and m are as defined above. $R^4$ corresponds to polyester diol residues derived from polyester diols characterized by a C:O ratio of >2.6 and preferably >3.0 and a C:H ratio of <10. In addition, these polyester diols are distinguished by a molecular weight of 1,000 to 20,000 and, more particularly, in the range from 1,000 to 10,000.

These special polyester diols are prepared by reaction of long-chain diols, particularly dimer diol (hydrogenated dimer fatty acid), with relatively short-chain dicarboxylic acids containing 4 to 8 carbon atoms or anhydrides thereof, particularly succinic acid or succinic anhydride. The polyester diols may also be prepared by reaction of relatively short-chain diols containing 4 to 8 carbon atoms, more particularly hexane-1,6-diol, with long-chain fatty acids, more particularly a dimer fatty acid mixture of dimerized fatty acids of acyclic and cyclic dicarboxylic acids containing on average 36 carbon atoms. However, mixtures of long-chain diols with relatively short-chain diols, more particularly mixtures of hexane diol and polyethylene glycol or mixtures of dimer diol and diethylene glycol, may also be used. In general, particularly preferred diols are linear or branched $C_{2-44}$ alkyl diols, such as ethylene glycol, 1,2- or 1,3-propylene glycol, butane-1,2-, -1,3- or -1,4-diol, neopentyl glycol, hexane-1,2-diol or -1,6-diol, decane-1,10-diol, octadecane-1,12-diol. However, cyclic $C_{6-44}$ alkyl diols are also suitable. Other preferred diols are diols containing ether groups, for example di-, tri- or tetraethylene or propylene glycol and oligomeric homologs thereof.

In general, particularly preferred dicarboxylic acids are linear or branched $C_{2-44}$ alkyl dicarboxylic acids, such as oxalic acid, malonic acid, succinic acid, glutaric acid, adipic acid, pimelic acid, suberic acid, azelaic acid, nonane dicarboxylic acid, decane dicarboxylic acid, undecane dicarboxylic acid or technical mixtures thereof. Unsaturated $C_{4-44}$ dicarboxylic acids, such as maleic acid, fumaric acid, itaconic acid or aconitic acid, may also be used for the reaction with the diols.

The esterification reaction may be carried out in a suitable solvent at elevated temperature in the presence of a catalyst, the water of reaction being azeotropically removed. Tin(II) octoate is preferably used as the catalyst while xylene is preferably used as the solvent. The polyester diols thus obtained are then reacted with one of the diisocyanates mentioned above in a) and the resulting reaction product is reacted with the hydroxyfunctional acrylates or methacrylates mentioned above in a) to form the polyurethane (meth) acrylate. One or more of these polyurethane (meth)acrylates based on the special polyester diols may be used in the form of a mixture with activators and optionally other typical additives as an adhesive composition.

The compounds corresponding to general formula (I) with n=3 are reaction products of the above-mentioned hydroxyfunctional acrylates or methacrylates with isocyanates which are obtainable by reaction of suitable linear or branched trihydric alcohols (triols) containing 3 to 6 carbon atoms with caprolactone and subsequent reaction with diisocyanates.

Polycaprolactone triols are obtainable in known manner by ring-opening polymerization of caprolactone with suitable triols, the ratio of caprolactone to triol being 1 to 10:1, i.e. 3 to 30 moles of caprolactone are reacted with 1 mole of triol.

Suitable triols are, in particular, those selected from the group consisting of glycerol, butane-1,2,4-triol, trimethylol propane (2-hydroxymethyl-2-ethylpropane-1,3-diol) and trimethylol ethane (2-methyl-2-hydroxymethylpropane-1,3-diol).

The reaction products of the triol and the caprolactone are then reacted with the diisocyanates mentioned in a) by methods known to the expert. The reaction product of the triol, the caprolactone and the diisocyanate is then reacted with the hydroxypropyl acrylate or methacrylate by methods known per se to form the polyurethane (meth)acrylate.

Component (C): The selection criterion is preferably the complete or substantially complete freedom from odor of the adhesive composition. Accordingly, neither methacrylic acid nor methyl methacrylate is used.

The adhesive composition may additionally contain one or more acrylate or methacrylate comonomers (C). These monomers (C) are selected from allyl acrylate, allyl methacrylate, 2-hydroxyethyl acrylate, 2-hydroxyethyl methacrylate, 2- or 3-hydroxypropyl acrylate, 2- or 3-hydroxypropyl methacrylate, 6-hydroxyhexyl acrylate, 6-hydroxyhexyl methacrylate, benzyl methacrylate, phenyl ethyl methacrylate, 2-phenoxyethyl methacrylate, morpholinoethyl methacrylate, dimethyl aminoethyl methacrylate, glycidyl methacrylate, piperidyl acrylamide, neopentyl methacrylate, isobornyl methacrylate, cyclohexyl methacrylate, tert.butyl methacrylate, tetrahydrofurfuryl methacrylate, bisphenol-A-bis-(hydroxypropyl methacrylate), maleic acid mono-2-methacryloyloxyethyl ester, 7,7,9-trimethyl-4,13-dioxo-3,14-dioxa-12-diazahexadec-1-ane, 16-diol dimethacrylate and 3-[2-(methacryloyloxy)-ethoxycarbonyl]-propionic acid, phthalic acid mono-2-methacryloyloxyethyl ester or mixtures thereof.

The composition according to the invention preferably contains 10 to 70% by weight of one or more compounds (B) and 90 to 30% by weight of one or more compounds (A) and/or (C), based on the total quantity of (A)+(B)+(C).

Preferred compounds (A) and (B) contain very few ester groups.

The driers are metal salts of organic acids soluble in organic solvents and binders of the kind typically added to oxidatively drying products to accelerate the drying process. The metal component may be selected from Co, Fe, Zr, Mn, Ce, Pb, Zn, Ca and Ba, Y, more particularly from Co, Fe and Zr. The acid component may be selected from naphthenic, resinic and aliphatic carboxylic acids containing 6 to 10 carbon atoms, ethyl hexanoic acid being particularly suitable. The following driers are specifically mentioned: $Co^{2+}$, $Fe^{2+}$ and $Zr^{2+}$ ethyl hexanoate and naphthenate. One or more driers may be used. Suitable sole driers are the salts of Co and Fe in conjunction with a transition metal accelerator or another accelerator, for example $Cu(acac)_2$, p-toluene sulfonic acid hydrazide. However, a mixture of driers is preferably used, for example driers containing the metals: Co/Fe, Co/Zr and Fe/Zr and also Co/Fe/Zr. In the case of Co/Fe and Co/Zr, the presence of a transition metal accelerator can again be particularly effective.

The driers are used in a concentration of 0.1 to 10% by weight and, more particularly, 1 to 6% by weight, based on the reactive monomers.

The effect of the driers is that the adhesives are no longer tacky at the interface with the surrounding air after 0.5 to 30 days and, more particularly, 1 to 3 days, even where they are present as films with a thickness of less than 0.1 mm. In addition, the constituent material of the substrate (for example steel, brass or ABS) is not an important factor. The adhesives set considerably more quickly. Thus, they have a pot life of 0.2 to 90 minutes, depending on their composition. The pot life is dependent on various factors, for example the content of acid, hydroxyalkyl methacrylate and polyurethane methacrylates, but especially on the type and concentration of initiator, accelerator and drier. In order to obtain complete and rapid curing, the polyurethane methacrylate should be based on a polyetherol.

The accelerators for the free radical polymerization of the compositions according to the invention are generally used in concentrations of less than 10% by weight, the preferred range being from about 0.1 to about 0.75% by weight. Sulfimides are a group of free radical accelerators, 3-oxo-2,3-dihydrobenz-(d)-isothiazole-1,1-dioxide—usually known as benzosulfimide or saccharin—being preferred. Tertiary amines may also be used as accelerators for the production of free radicals, the amine N,N-dimethyl-p-toluidine and ethoxylated p-toluidine being preferred along with tributylamine. Acids having a pKa value below 6 are also useful accelerators. The same applies to hydrazine derivatives of the type described in U.S. Pat. No. 4,321,349 (R. Rich) which have proved to be extremely effective in the compositions according to the invention. Besides p-toluene sulfonic acid hydrazide, the preferred hydrazine is 1-acetyl-2-phenyl hydrazine. Suitable hydrazines generally have the following formula:

$$R^1-NH-NH-CO-R^2$$

in which $R^1$ and $R^2$ may be the same or different and represent linear or branched $C_{1-6}$ alkyl groups, $C_{1-4}$ alkyl groups and $C_{1-4}$ aryl groups. The optional hydrazines are present in sufficient quantities to accelerate the polymerization at room temperature. Transition metal accelerators are preferably a salt or complex of copper, vanadium or nickel. Examples of these accelerators are—preferably—copper octoate, copper naphthenate, copper ethyl hexanoate and, in particular, copper acetate and copper acetyl acetonate. The transition metal accelerator should be soluble in the polymerizable material. The transition metal accelerator must be present in that part of the adhesive composition which does not contain a free radical initiator or the hydrazine derivative. The relevant part of the adhesive composition contains the transition metal accelerator in a quantity of 0.01 to 3% by weight and preferably in a quantity of 0.1 to 1% by weight, based on the quantity of reactive monomers.

The initiators may be of the organic peroxy or hydroperoxy type, of the perester or peracid type or a persalt. Particularly useful initiators are the peresters and peroxides, among which t-butyl perbenzoate, t-butyl peroctoate and cumene hydroperoxide are preferred. The initiators are normally used in quantities of about 0.1 to about 10% by weight of the composition.

Besides the reactive monomers, initiators, accelerators and driers, the adhesive according to the invention may also contain additives to obtain desirable effects for the particular application envisaged. These additives include in particular dyes, inhibitors, chelators, viscosity controllers, etc. Suitable dyes are Sudanrot 380 and Sudanblau 670. The inhibitors are usually selected from the group consisting of hydroquinones, benzoquinones, naphthoquinones, phenanthraquinones, anthraquinones and any substituted compounds thereof. Various phenols may also be used as inhibitors, 2,6-ditert.butyl4-methylphenol being preferred. Suitable chelators are β-diketones and the salt of ethylenediamine tetraacetic acid (EDTA). Both the inhibitors and the chelators may be effectively used in quantities of about 0.1 to about 1% by weight without any adverse effect on the curing rate of the polymerizable adhesive composition. Thickeners, plasticizers, diluents, thixotropicizing agents and other additives typically used in the adhesives field may be added in the usual way and in the usual quantities to achieve the required viscosity. Emulsifiers are capable of improving the compatibility of all the components.

The adhesives according to the invention are preferably marketed in the form of two components in order to avoid stability problems during storage. The two parts of the adhesive composition preferably contain similar amounts of the reactive monomers. The initiators for the free radical reaction have to be kept in one part of the adhesive and the transition metal accelerators and driers in the other part. Each part remains stable until it is mixed with the other which initiates curing of the adhesive composition. Certain compounds which are known to accelerate the formation of free radicals may be in the same part as the initiators for free radicals without any stability problems arising. For example, sulfimides and hydrazine derivatives may be added to the part which contains the initiators. However, transition metal salts and complexes which are necessary for the purposes of the invention should not be added to the same part as the initiators or the hydrazine derivatives.

Although it is not absolutely essential that equivalent or identical amounts of polymerizable material should be present in the two parts, it is nevertheless recommended that this be the case in order to facilitate diffusion of the various components in each part (particularly the initiators and the accelerators). The rheology of the two parts should be substantially similar or the same in order to promote effective mixing of the initiator in one part with the drier in the other part and to facilitate uniform curing through the polymerizable material. One of the components (component A) preferably contains constituents of the type typically present in an anaerobic adhesive, namely (meth)acrylates, peroxides accelerators and amines. Component (B) contains constituents which are typically present in an aerobically curing adhesive, i.e. (meth)acrylates, accelerators and driers. Adhesives with the following outstanding properties can be produced by suitably selecting the type and quantity of individual constituents:

Complete curing, even of very thin adhesive films, on various substrates (metals and plastics) so that, after 12 hours to 3 days, the adhesive is no longer tacky, even on exposure to air.

Rapid curing (pot life around 15 seconds) where copper compounds are used as accelerators.

Very high strength of adhesion to metal surfaces, such as steel, brass, copper and aluminium, irrespective of whether they are smooth or have merely been degreased with acetone or chromated (yellow, olive and white or blue with cleaning by ethanol) or corundum-blasted.

Good adhesion to plastics, such as ABS, PVC and PC.

Substantial freedom from odor.

By virtue of these properties, the adhesive according to the invention may be used for a variety of applications. It is particularly suitable for use in the electrical industry, for example for the high-strength and moisture-resistant bonding of ferrites and chromated hollow plates (loudspeakers) and galvanized steel housings (electric motors).

The invention is illustrated by the following Examples.

EXAMPLES

Viscosity was measured with a cone/plate viscosimeter. Tensile shear strength (TSS) was measured in accordance with DIN 53283.

I. General production procedure

The polyurethane dimethacrylates (PUMA) 1 to 7 used in the Examples are prepared in known manner and are used in the form of 80% solutions in hydroxypropyl methacrylate (HPMA). PUMA 1 to 4 were prepared in accordance with Comparison Example 12 of DE 44 41 463 from a polyester diol and TDI; PUMA 3 was similarly prepared from poly-THF, MDI and HEMA; PUMA 2 and 5 were similarly prepared from a polyesterdiol, MDI and HPMA and, finally, PUMA 7 was similarly prepared from polypropylene glycol, MDI and HEMA.

GR 80 is 3-[2-(methacryloyloxy)-ethoxycarbonyl] propionic acid.

HDK V 15 and Cab-o-Sil 720 are silicas (thixotropicizing agent).

Bisomer EMP is phthalic acid mono-2-methacryloyloxyethyl ester.

II. Composition of the A components in g:

The components were successively added (mixed or dissolved). Total duration around 5 hours.

1. 122 PUMA 2
   67 HPMA
   4 Stabilizer solution
   6 Trigonox K 80 (cumene hydroperoxide, 80%)
   1.5 Tributylamine
   0.3 Saccharin (benzoic acid sulfimide)
   1 Porophor TSH (p-toluene sulfonic acid hydrazide)
2. 110 PUMA 2
   75 HPMA
   4 Stabilizer solution
   6 Trigonox K 80
   1.5 Tributyl amine
   1 Porophor TSH
3. 110 PUMA 4
   75 HPMA
   4 Stabilizer solution
   6 Trigonox K 80
   1.5 Tributylamine
   1 Porophor TSH 2 HDK V 15 (SiO$_2$)
4. 21 PUMA 4
   95 PUMA 2
   70 HPMA
   4 Stabilizer solution
   6 Trigonox K 80
   1.5 Tributyl amine
   1 Porophor TSH
5. 110 PUMA 3
   75 HPMA
   4 Stabilizer solution
   6 CUHP 80
   1.5 Tributylamine
   0.366 Saccharin
   1 Porophor TSH
   0.02 Sudanrot 380
6. 110 PUMA 2
   75 HPMA
   4 Stabilizer solution
   6 CUHP 80 (cumene hydroperoxide, 80%)
   1.5 Tributylamine
   0.366 Saccharin
   1.0 Porophor TSH
7. 110 PUMA 2
   75 HPMA
   4 Stabilizer solution
   6 CUHP 80
   1.6 N,N-dimethyl-p-toluidine
   0.5 Saccharin
   1.5 Porophor TSH
8. 110 PUMA 5
   75 HPMA
   4 Stabilizer solution
   6 CUHP 80
   1.5 Tributylamine
   1.0 Porophor TSH
   0.02 Sudanrot 380
9. 110 PUMA 6
   75 HPMA
   4 Stabilizer solution
   6 CUHP 80
   2.0 Tributylamine
   1.5 Porophor TSH
   0.02 Sudanrot 380
10. 110 PUMA 5
    75 HPMA
    4 Stabilizer solution
    6 CUHP 80
    1.5 Tributylamine
    1.5 N-Acetyl-N'-phenyl hydrazine
    0.02 Sudanrot 380
11. 110 PUMA 1
    75 HPMA
    4 Stabilizer solution
    6 CUHP 80
    1.5 Tributylamine
    0.366 Saccharin
    1.0 Porophor TSH
    0.02 Sudanrot 380
12. 134 PUMA 5
    100 HPMA
    5 Stabilizer solution
    7.5 CUPH 80
    1.3 Tributylamine
    1.3 N-Acetyl-N'-phenyl hydrazine
    0.02 Sudanrot 380
13. 128 PUMA 7
    66 HPMA
    4 Stabilizer solution
    6 CUPH 80
    1 Tributylamine
    1.5 N-Acetyl-N'-phenyl hydrazine
    0.02 Sudanrot 380
    4.0 Cab-o-Sil 720
14. 80 PUMA 5
    55 HPMA
    3 Stabilizer solution
    4 CUPH 80
    1 Tributylamine
    1 N-Acetyl-N'-phenyl hydrazine
    0.01 Sudanrot 380
15. 55 PUMA 5
    37 HPMA
    2 Stabilizer solution
    3 CUPH 80
    0.8 Tributylamine
    0.5 N-Acetyl-N'-phenyl hydrazine
    0.01 Sudanrot 380
16. 55 PUMA
    37 HPMA
    2 Stabilizer solution
    3 CUPH 80
    0.8 Tributylamine
    0.25 N-Acetyl-N'-phenyl hydrazine
    0.01 Sudanrot 380
17. 106 PUMA 2
    36 HPMA
    27 Benzyl methacrylate
    4 Stabilizer solution
    6 CUPH 80
    1 Tributylamine
    1 N-Acetyl-N'-phenyl hydrazine
    0.02 Sudanrot 380
18. 115 PUMA 5
    54 HPMA
    4 Stabilizer solution
    6 CUPH 80
    0.5 Tributylamine
    1 N-Acetyl-N'-phenyl hydrazine
    0.02 Sudanrot 380
19. 134 PUMA 5
    100 HPMA
    5 Stabilizer solution
    7.5 CUPH 80
    1.3 Tributylamine
    1.3 N-Acetyl-N'-phenyl hydrazine 0.02 Sudanrot 380
7 Cab-o-Sil 720
20. 92 PUMA 5
   73 HPMA
   4 Stabilizer solution
   6 CUPH 80
   1 Tributylamine
   0.1 M-Acetyl-N'-phenyl hydrazine
   0.02 Sudanrot 380
   6 Cab-o-Sil 720
21 167 PUMA 5
   100 HPMA
   5 Stabilizer solution
   7.5 CUPH 80
   1.3 Tributylamine
   1.3 N-Acetyl-N'-phenyl hydrazine
   0.02 Sudanrot 380
III Composition of the B components in g:
1. 60 GR 80
   60 HPMA
   0.261 Cu(II) acetyl acetonate
   0.366 Saccharin
   100 PUMA 2
2. 30 GR 80
   60 HPMA
   0.135 Cu(II) acetyl acetonate
   0.366 Saccharin
   100 PUMA 2
   2 Octa Soligen Kobalt 6 (Co octoate)
   0.352 Mn(III) acetyl acetonate
3. 30 GR 80
   60 HPMA
   0.135 Cu(II) acetyl acetonate
   0.366 Saccharin
   100 PUMA 2
   2 Octa Soligen Kobalt 6
4. 30 GR 80
   60 HPMA
   0.135 Cu(II) acetyl acetonate
   0.366 Saccharin
   100 PUMA 4
   2.5 Octa Soligen Kobalt 6
   0.352 Mn(III) acetyl acetonate
   2 HDK V 15
5. 30 GR 80
   60 HPMA
   0.135 Cu(II) acetyl acetonate
   0.366 Saccharin
   100 PUMA 2
   2 Octa Soligen Kobalt 6
   0.37 Fe(III) acetyl acetonate
6. 30 GR 80
   60 HPMA
   0.135 Cu(II) acetyl acetonate
   0.366 Saccharin
   15 PUMA 4
   86 PUMA 2
   2 Octa Soligen Kobalt 6
7. 30 GR 80
   60 HPMA
   0.07 Cu(II) acetyl acetonate
   0.194 Saccharin
   100 PUMA 2
   2 Octa Soligen Kobalt 6
8. 30 GR 80
   60 HPMA
   0.27 Cu(II) acetyl acetonate
   0.5 Saccharin
   100 PUMA 2
   2.5 Octa Soligen Kobalt 6
   2.5 Octa Soligen Zirkonium 6 (Zr octoate)
9. 30 GR 80
   60 HPMA
   0.07 Cu(II) acetate
   0.366 Saccharin
   100 PUMA 2
10. 30 GR 80
   60 HPMA
   5 Octa Soligen Kobalt 6
   0.366 Saccharin
   100 PUMA 2
11. 300 GR 80
   600 HPMA
   25 Octa Soligen Kobalt 6
   1000 PUMA 2
   0.2 Sudanblau 670
12. 30 GR 80
   60 HPMA
   0.135 Cu(II) acetyl acetonate
   2.5 Octa Soligen Kobalt 6
   100 PUMA 2
13. 30 GR 80
   60 HPMA
   0.135 Cu(II) acetyl acetonate
   2.5 Octa Soligen Mangan 6 (Mn octoate)
   100 PUMA 2
   0.366 Saccharin
14. 30 GR 80
   60 HPMA
   0.091 Cu(II) acetate
   2.5 Octa Soligen Mangan 6
   100 PUMA 2
   0.366 Saccharin
15. 100 HPMA
   0.135 Cu(II) acetyl acetonate
   2.5 Octa Soligen Kobalt 6
   100 PUMA 2
16. 100 HPMA
   0.366 Saccharin
   2.5 Octa Soligen Kobalt 6
   100 PUMA 2
17. 100 HPMA
   0.366 Saccharin
   2.5 Octa Soligen Mangan 6
   100 PUMA 2
   0.125 Mn(II) acetyl acetonate 0.125 Co(II) acetyl acetonate
18. 60 HPMA
   30 GR 80
   0.135 Cu(II) acetyl acetonate
   1.0 Octa Soligen Kobalt 12
   1.5 Octa Soligen Zirkonium 6
   100 PUMA 2
   0.02 Sudanblau 670
19. 60 HPMA
   30 GR 80
   0.135 Cu(II) acetyl acetonate
   1.5 Octa Soligen Kobalt 12
   1.0 Octa Soligen Mangan 6
   100 PUMA 2
   0.02 Sudanblau 670
20. 60 HPMA
   30 GR 80
   1.5 Octa Soligen Kobalt 12
   1.0 Octa Soligen Cer 6 (Ce octoate)
   100 PUMA 2
   0.02 Sudanblau 670
21. 60 HPMA
   30 GR 80
   0.135 Cu(II) acetyl acetonate
   1.0 Octa Soligen Kobalt 12
   1.0 Octa Soligen Zirkonium 6
   1.0 Octa Soligen Cer 6
   100 PUMA 2
   0.02 Sudanblau 670
22. 60 HPMA
   30 GR 80
   0.135 Cu(II) acetyl acetonate
   1.0 Octa Soligen Kobalt 12
   100 PUMA 2
   0.02 Sudanblau 670
23. 60 HPMA
   30 GR 80
   0.135 Cu(II) acetyl acetonate
   0.366 Saccharin
   2.5 Octa Soligen Kobalt 6
   100 PUMA 2
   0.02 Sudanblau 670
24. 60 HPMA
   30 GR 80
   0.135 Cu(II) acetyl acetonate
   0.366 Saccharin
   2.5 Octa Soligen Kobalt 6
   2.0 Octa Soligen 173 (1.2% Co, 7.2% Ba, 3.2% Zr)
   100 PUMA 5
   0.02 Sudanblau 670
25. 60 HPMA
   30 GR 80
   0.135 Cu(II) acetyl acetonate
   0.366 Saccharin
   2.5 Octa Soligen Kobalt 6
   2.0 Octa Soligen 203 (1.2% Co, 7.2% Ba, 3.2% Zn)
   100 PUMA 5
   0.02 Sudanblau 670
26. 60 HPMA
   30 GR 80
   0.135 Cu(II) acetyl acetonate
   0.366 Saccharin
   2.5 Octa Soligen Kobalt 6
   2.0 Octa Soligen 69 (6% Co, 9% Zr)
   100 PUMA 5
   0.02 Sudanblau 670
27. 60 HPMA
   30 GR 80
   0.135 Cu(II) acetyl acetonate
   0.366 Saccharin
   2.0 Octa Soligen Kobalt 12
   2.0 Octa Soligen Zirkonium 18
   100 PUMA 5
   0.02 Sudanblau 670
28. 60 HPMA
   30 GR 80
   0.135 Cu(II) acetyl acetonate
   0.366 Saccharin
   2.5 Octa Soligen Kobalt 6
   4.0 Octa Soligen 69 (6% Co, 9% Zr)
   100 PUMA 5
   0.02 Sudanblau 670
29. 60 HPMA
   30 GR 80
   0.135 Cu(II) acetyl acetonate
   0.366 Saccharin
   2.5 Octa Soligen Kobalt 6
   8.0 Octa Soligen 69
   100 PUMA 5
   0.02 Sudanblau 670
30. 60 HPMA
   30 GR 80
   0.135 Cu(II) acetyl acetonate
   0.366 Saccharin
   10.0 Octa Soligen 69
   100 PUMA 6
   0.02 Sudanblau 670
31. 60 HPMA
   30 GR 80
   0.135 Cu(II) acetyl acetonate
   0.866 Saccharin
   10.0 Octa Soligen 69
   100 PUMA 6
   0.02 Sudanblau 670
32. 60 HPMA
   30 GR 80
   0.135 Cu(II) acetyl acetonate
   1.366 Saccharin
   10.0 Octa Soligen 69
   100 PUMA 6
   0.02 Sudanblau 670
33. 60 HPMA
   30 HEMAN (maleic acid mono-2-methacryloyloxyethyl ester)
   0.135 Cu(II) acetyl acetonate
   1.366 Saccharin 10,0 Octa Soligen 69
100 PUMA 6
0.02 Sudanblau 670
34. 60 HPMA
  30 GR 80
  0.135 Cu(II) acetyl acetonate
  2.5 Octa Soligen Kobalt 6
  100 PUMA 1
  0.02 Sudanblau 670
35. 34 GR 80
  80 HPMA
  0.005 Soligen Kupfer 8
  1.5 Saccharin
  124 PUMA 2
  5.6 Octa Soligen Trockner 69 (Co/Zr octate)
  5.6 Octa Soligen Eisen 7/8
  0.02 Sudanblau
36. 34 GR 80
  80 HPMA
  0.125 Solingen Kupfer 8
  1.5 Saccharin
  124 PUMA 2
  5.6 Octa Soligen Trockner 69 (Co/Zr Octoate)
  5.6 Octa Soligen Eisen 7/8
  0.02 Sudanblau
37. 26 GR 80
  51 HPMA
  1.15 Saccharin
  97 PUMA 2
  4.8 Octa Soligen Trockner 69 (Co/Zr octoate)
  0.02 Sudanblau
38. 26 GR 80
  51 HPMA
  0.36 Solingen Kupfer 8
  1.15 Saccharin
  97 PUMA 2
  4.8 Octa Soligen Trockner 69 (Co/Zr octoate)
  0.02 Sudanblau
39. 34 Bisomer EMP
  48 HPMA
  1.1 Saccharin
  89 PUMA 2
  4 Octa Soligen Trockner 69 (Co/Zr octoate)
  4 Octa Soligen Eisen 7/8
  0.02 Sudanblau
40. 34 Bisomer EMP
  48 HPMA
  0.36 Solingen Kupfer 8
  1.1 Saccharin
  89 PUMA 2
  4 Octa Soligen Trockner 69 (Co/Zr octoate)
  4 Octa Soligen Eisen 7/8
  0.02 Sudanblau
41. 34 Bisomer EMP
  48 HPMA
  1.1 Saccharin
  89 PUMA 2
  4 Octa Soligen Trockner 69 (Co/Zr octoate)
  4 Octa Soligen Eisen 7/8
  0.02 Sudanblau
42. 34 Bisomer EMP
  48 HPMA
  0.36 Solingen Kupfer 8
  1.1 Saccharin
  89 PUMA 5
  4 Octa Soligen Trockner 69 (Co/Zr Octoate)
  4 Octa Soligen Eisen 7/8
  0.02 Sudanblau
43. 45 HEMAM
  28 HPMA
  1.26 Saccharin
  102 PUMA 2
  4.8 Octa Soligen Trockner 69 (Co/Zr Octoate)
  0.02 Sudanblau
44. 45 HEMAM
  28 HPMA
  0.36 Solingen Kupfer 8
  1.26 Saccharin
  102 PUMA 2
  4.8 Octa Soligen Trockner 69 (Co/Zr Octoate)
  0.02 Sudanblau
45. 24 GR 80
  48 HPMA
  1.1 Saccharin
  98 PUMA 2
  4 Octa Soligen Trockner 69 (Co/Zr Octoate)
  0.02 Sudanblau
  5.4 Cab-o-Sil 720
46. 24 GR 80
  48 HPMA
  98 PUMA 2
  4 Octa Soligen Trockner 69 (Co/Zr Octoate)
  0.02 Sudanblau
  5.4 Cab-o-Sil 720
47. 43 GR 80
  42 HPMA
  0.013 Solingen Kupfer 8
  1.26 Saccharin
  85 PUMA 7
  4.8 Octa Soligen Trockner 69 (Co/Zr Octoate)
  0.02 Sudanblau
  4 Cab-o-Sil 720
48. 34 GR 80
  80 HPMA
  0.005 Solingen Kupfer 8
  1.5 Saccharin
  149 PUMA 2
  5.6 Octa Soligen Trockner 69 (Co/Zr Octoate)
  5.6 Octa Soligen Eisen 7/8
  0.02 Sudanblau IV A/B Adhesive systems (combinations and bonds tested):
Mixing ratio of A to B=1:1; quantity applied: 50 to 80 mg/250 mm$^2$ Comparison Example 1

1A/1B Not tack-free after 72 h
Gel time or pot life per two g: 30 s 38° C. (=30 seconds at 28° C.)

Tensile shear strength (N/mm$^2$) after 12 h RT or 12 RT (=after 12 hours at 20 to 22° C.) steel/steel (corundum-blasted): 26.3
Al/Al (corundum-blasted): 7.2
1. 2A/2B
Gel time or pot life per 2 g: 120 s 28° C. (=120 seconds at 28° C.)
Tensile shear strength (N/mm$^2$) after 72 h RT or 72 RT (=after 72 hours at 20 to 22° C.)
Steel/steel (corundum-blasted): 29.6
Steel/steel (smooth): 30.7
Brass/brass (smooth): 17.8
V2A/V2A (smooth): 28.0
PVC/PVC (smooth): 5.7 (MF) (MF=material failure)
Al/Al (corundum-blasted): 26.6
Al/Al (smooth): 15.8
Cu/Cu (smooth): 16.4
ABS/ABS (smooth): 5.6 (MF)
GRP/GRP (smooth): 4.1
Tensile shear strength (N/mm$^2$) after 3 h 80° C.
Steel/steel (corundum-blasted): 38.1
Steel/steel (smooth): 34.3
PC/PC (smooth): 4.2
PVC/PVC (smooth): 8.7 (MF)
Al/Al (corundum-blasted): 32.0
Al/Al (smooth): 21.7
ABS/ABS (smooth): 8.3 (MF)
GRP/GRP (smooth): 6.2
2. 2A/3B
Gel time or pot life per two g: 90 s 25° C.
Tensile shear strength (N/mm$^2$) after 72 h RT
Steel/steel (corundum-blasted): 29.9
Steel/steel (smooth): 29.9
GRP/GRP (smooth): 3.1
Al/Al (corundum-blasted): 31.7
Al/Al (smooth): 16.7
3. 4A/4B
Gel time or pot life per two g: 150 s 25° C.
Tensile shear strength (N/mm$^2$) after 1 h 90° C.
Steel/steel (corundum-blasted): 14.4
Steel/steel (smooth): 13.4
Brass/brass (smooth):10.7
V2A/V2A (smooth): 9.5
Al/Al (corundum-blasted): 15.7
Al/Al (smooth): 14.1
Cu/Cu (smooth): 13.1
4. 1 A5B
Tensile shear strength (N/mm$^2$) after 24 h RT
Steel/steel (corundum-blasted): 34.1
Steel/steel (smooth):25.4
Al/Al (corundum-blasted): 29.1
Al/Al (smooth): 11.5
5. 4A/6B
Gel time or pot life per two g: 60 s 25° C.
Tensile shear strength (N/mm$^2$) after 12 RT
Steel/steel (corundum-blasted): 30.3
Steel/steel (smooth): 29
Brass/brass (smooth): 18.3
V2A/V2A (smooth): 21.4
Al/Al (corundum-blasted): 25.2
Al/Al (smooth): 12.2
Cu/Cu (smooth): 16.4
6. 2A/7B
Gel time or pot life per two g: 140 s 25° C.
Tensile shear strength (N/mm$^2$) after 1 h 90° C.
Steel/steel (smooth) 31.2
Al/Al (smooth): 13.8
7. 2A/8B
Gel time or pot life per two g: 30 s 28° C.
Tensile shear strength (N/mm$^2$) after 12 RT
Steel/steel (corundum-blasted): 34.8
Steel/steel (smooth):32.2
Brass/brass (smooth): 15.7
V2A/V2A (smooth): 24.9
Al/Al (corundum-blasted): 30.5
Al/Al (smooth): 11.2
Cu/Cu (smooth): 17.1
8. 2A/9B
Tensile shear strength (N/mm$^2$) after 72 RT
Steel/steel (smooth): 18.8
Al/Al (smooth): 5.4
9. 2A/10B
Gel time or pot life per two g: 12 mins. 25° C.
Tensile shear strength (N/mm$^2$) after 12 RT
Steel/steel (smooth): 25.2
Brass/brass (smooth): 23.1
V2A/V2A (smooth): 13.7
Al/Al (smooth): 9.6
ABS/ABS (smooth): 4.6
10. 5A/11B
Gel time or pot life per two g: 65 s 25° C.
Tensile shear strength (N/mm$^2$2) after 12 RT
Steel/steel (corundum-blasted): 33.5
Steel/steel (smooth): 32.2
Brass/brass (smooth): 23.6
Steel (yellow chromated): 6.4
Steel (olive chromated): 11.9
Steel (white chromated): 18.7
Al/Al (corundum-blasted): 31.5
Al/Al (smooth): 18.9
V2A/V2A (smooth): 25.8
11. 2A/1 3B
Gel time or pot life per two g: not tested
Tensile shear strength (N/mm$^2$) after 12 RT
Steel/steel (corundum-blasted): 30.3
Steel/steel (smooth): 22.3
Brass/brass (smooth): 10.5
Cu/Cu (smooth): 16.8
Al/Al (corundum-blasted): 29.0
Al/Al (smooth): 5.0
V2A/V2A (smooth): 16.0
12. 2A/14B
Gel time or pot life per two g: 90 s 25° C.
Tensile shear strength (N/mm$^2$) after 12 RT
Steel/steel (corundum-blasted): 20.9
Steel/steel (smooth): 19.6
Brass/brass (smooth): 14.3
Cu/Cu (smooth): 15.8
Al/Al (corundum-blasted): 20.0
Al/Al (smooth): 4.4
V2A/V2A (smooth): 21.6
13. 6A/12B
Gel time or pot life per two g: 55 s 28° C.
Tensile shear strength (N/mm$^2$) after 12 RT
Steel/steel (corundum-blasted): 31.7
Steel/steel (smooth): 28.0
Brass/brass (smooth): 22.7
Cu/Cu (smooth): 17.7
Al/Al (corundum-blasted): 27.9
Al/Al (smooth): 13.9
V2A/V2A (smooth): 26.3
14. 6A/3B
Gel time or pot life per two g: 45 s 25° C.
Tensile shear strength (N/mm$^2$) after 72 RT Steel/steel (corundum-blasted): 34.3
Steel/steel (smooth): 30.7
Brass/brass (smooth): 23.8
Cu/Cu (smooth): 14.0
Al/Al (corundum-blasted): 27.6
Al/Al (smooth): 14.0
V2A/V2A (smooth): 21.5
15. 6A/15B
Gel time or pot life per two g: 30 s 25° C.
Tensile shear strength (N/mm$^2$) after 12 RT
Steel/steel (corundum-blasted): 33.3
Steel/steel (smooth): 26.8
Brass/brass (smooth): 6.5
Cu/Cu (smooth): 11.1
Al/Al (corundum-blasted): 21.5
Al/Al (smooth): 4.3
V2A/V2A (smooth): 7.1
16. 6A/16B
Gel time or pot life per two g: 150 s 25° C.
Tensile shear strength (N/mm$^2$) after 12 RT
Steel/steel (corundum-blasted): 35.2
Steel/steel (smooth): 14.0
Brass/brass (smooth): 8.5
Cu/Cu (smooth): 9.5
PVC/PVC (smooth): 5.9
Al/Al (corundum-blasted): 21.1
Al/Al (smooth): 2.3
V2A/V2A (smooth): 13.6
ABS/ABS (smooth): 7.4
PC/PC (smooth): 2.4
17. 6A/17B
Gel time or pot life per two g: 900 s 29° C.
Tensile shear strength (N/mm$^2$) after 12 RT
Steel/steel (corundum-blasted): 31.2
Steel/steel (smooth): 12.3
Brass/brass (smooth): 5.4
Cu/Cu (smooth): 8.8
Al/Al (corundum-blasted): 20.6
Al/Al (smooth): 4.6
V2A/V2A (smooth): 10.0
ABS/ABS (smooth): 4.9
18. 7A/3B
Gel time or pot life per two g: 15 s 28° C.
Tensile shear strength (N/mm$^2$) after 12 RT
Steel/steel (corundum-blasted): 29.9
Steel/steel (smooth): 21.5
Brass/brass (smooth): 17.0
Cu/Cu (smooth): 13.5
Al/Al (corundum-blasted): 22.7
Al/Al (smooth): 7.3
V2A/V2A (smooth): 15.7
19. 5A/18B
Gel time or pot life per two g: 45 s 29° C.
Tensile shear strength (N/mm$^2$) after 12 RT
Steel/steel (corundum-blasted): 34.7
Steel/steel (smooth): 27.6
Brass/brass (smooth): 18.1
Cu/Cu (smooth): 13.6
Al/Al (corundum-blasted): 25.4
Al/Al (smooth): 19.6
V2A/V2A (smooth): 26.6
ABS/ABS (smooth): 6.6
20. 5A/19B
Gel time or pot life per two g: 50 s 29° C.
Tensile shear strength (N/mm$^2$) after 12 RT
Steel/steel (corundum-blasted): 37.1
Steel/steel (smooth): 31.5
Brass/brass (smooth): 21.4
Cu/Cu (smooth): 13.1
Al/Al (corundum-blasted): 29.3
Al/Al (smooth): 15.1
V2A/V2A (smooth): 18.2
ABS/ABS (smooth): 6.1
21. 5A/20B
Gel time or pot life per two g: 55 s 29° C.
Tensile shear strength (N/mm$^2$) after 12 RT
Steel/steel (corundum-blasted): 29.2
Steel/steel (smooth): 28.2
Brass/brass (smooth): 25.3
Cu/Cu (smooth): 14.5
Al/Al (corundum-blasted): 29.9
Al/Al (smooth): 15.6
V2A/V2A (smooth): 21.6
ABS/ABS (smooth): 4.1
22. 5A/21 B
Gel time or pot life per two g: 55 s 29° C.
Tensile shear strength (N/mm$^2$) after 72 RT
Steel/steel (corundum-blasted): 31.3
Steel/steel (smooth): 28.3
Brass/brass (smooth): 19.1
Cu/Cu (smooth): 13.4
Al/Al (corundum-blasted): 30.0
Al/Al (smooth): 14.0
V2A/V2A (smooth): 22.9
ABS/ABS (smooth): 4.4
23. 5A/22B
Gel time or pot life per two g: 55 s 29° C.
Tensile shear strength (N/mm$^2$) after 12 RT
Steel/steel (corundum-blasted): 24.5
Steel/steel (smooth): 30.5
Brass/brass (smooth): 25.5
Cu/Cu (smooth): 14.3
Al/Al (corundum-blasted): 26.7
Al/Al (smooth): 16.5
V2A/V2A (smooth): 25.3
ABS/ABS (smooth): 4.4
24. 8A/23B
Gel time or pot life per two g: 80 s 22° C.
Tensile shear strength (N/mm$^2$) after 12 RT
Brass/brass (smooth): 13.9
Cu/Cu (smooth): 15.8
Al/Al (corundum-blasted): 13.4
Al/Al (smooth): 13.5
V2A/V2A (smooth): 12.7
25. 8A/24B
Gel time or pot life per two g: 85 s 21° C.
Tensile shear strength (N/mm$^2$) after 72 RT
Brass/brass (smooth): 13.4
Cu/Cu (smooth): 14.5
Al/Al (smooth): 11.5
V2A/V2A (smooth): 13.6
26. 8A/25B
Gel time or pot life per two g: 80 s 21° C.
Tensile shear strength (N/mm$^2$) after 72 RT
Brass/brass (smooth): 15.6
Cu/Cu (smooth): 13.2
Al/Al (smooth): 10.0
V2A/V2A (smooth): 13.3
27. 8A/26B
Gel time or pot life per two g: 75 s 23° C.
Tensile shear strength (N/mm$^2$) after 72 RT
Brass/brass (smooth): 14.5
Cu/Cu (smooth): 14.1
Al/Al (smooth): 10.9

V2A/V2A (smooth): 15.3
28. 8A/27B
Gel time or pot life per two g: 80 s 21° C.
Tensile shear strength (N/mm$^2$) after 72 RT
Brass/brass (smooth): 15.4
Cu/Cu (smooth): 13.9
Al/Al (smooth): 10.9
V2A/V2A (smooth): 13.4
29. 8A/28B
Gel time or pot life per two g: 90 s 22° C.
Tensile shear strength (N/mm$^2$) after 72 RT
Brass/brass (smooth): 15.5
Cu/Cu (smooth): 10.8
Al/Al (smooth): 9.9
V2A/V2A (smooth): 12.8
30. 8A/29B
Gel time or pot life per two g: 100 s 21° C.
Tensile shear strength (N/mm$^2$) after 72 RT
Brass/brass (smooth): 11.5
Cu/Cu (smooth): 12.3
Al/Al (smooth): 10.5
V2A/V2A (smooth): 13.5
31. 8A/30B
Gel time or pot life per two g: 90 s 22° C.
Tensile shear strength (N/mm$^2$) after 72 RT
Brass/brass (smooth): 13.8
Cu/Cu (smooth): 15.3
Al/Al (smooth): 12.3
V2A/V2A (smooth): 13.5
32. 8A/31 B
Gel time or pot life per two g: 60 s 22° C.
Tensile shear strength (N/mm$^2$) after 12 RT
Steel/steel (smooth): 15.3
Brass/brass (smooth): 16.8
Cu/Cu (smooth): 12.6
Al/Al (smooth): 14.4
V2A/V2A (smooth): 14.0
33. 8A/32B
Gel time or pot life per two g: 45 s 22° C.
Tensile shear strength (N/mm$^2$) after 12 RT
Steel/steel (smooth): 14.5
Brass/brass (smooth): 15.1
Cu/Cu (smooth): 15.0
Al/Al (smooth): 16.6
V2A/V2A (smooth): 13.6
34. 9A/31 B
Gel time or pot life per two g: 40 s 22° C.
Tensile shear strength (N/mm$^2$) after 12 RT
Steel/steel (smooth): 15.7
Brass/brass (smooth): 14.4
Cu/Cu (smooth): 14.6
Al/Al (smooth): 14.6
V2A/V2A (smooth): 14.5
35. 9A/32B
Gel time or pot life per two g: 40 s 22° C.
Tensile shear strength (N/mm$^2$) after 12 RT
Steel/steel (smooth): 12.9
Brass/brass (smooth): 15.3
Cu/Cu (smooth): 12.7
Al/Al (smooth): 12.8
V2A/V2A (smooth): 14.7
36. 9A/30B
Gel time or pot life per two g: 60 s 22° C.
Tensile shear strength (N/mm$^2$) after 12 RT
Steel/steel (smooth): 15.4
Brass/brass (smooth): 13.1
Cu/Cu (smooth): 13.3
Al/Al (smooth): 15.3
V2A/V2A (smooth): 13.3
37. 1 OA/31 B
Gel time or pot life per two g: 30 s 21° C.
Tensile shear strength (N/mm$^2$) after 12 RT
Steel/steel (smooth): 14.3
Brass/brass (smooth): 17.4
Cu/Cu (smooth): 10.0
Al/Al (smooth): 13.5
V2A/V2A (smooth): 11.1
38. 1 OA/32B
Gel time or pot life per two g: 25 s 21° C.
Tensile shear strength (N/mm$^2$) after 12 RT
Steel/steel (smooth): 11.3
Brass/brass (smooth): 14.5
Cu/Cu (smooth): 14.6
Al/Al (smooth): 13.0
V2A/V2A (smooth): 10.8
39. 10A/30B
Gel time or pot life per two g: 45 s 21° C.
Tensile shear strength (N/mm$^2$) after 12 RT
Steel/steel (smooth): 16.9
Brass/brass (smooth): 15.8
Cu/Cu (smooth): 13.1
Al/Al (smooth): 14.6
V2A/V2A (smooth): 12.1
40. 1 OA/33B
Gel time or pot life per two g: 25 s 21° C.
Tensile shear strength (N/mm$^2$) after 12 RT
Steel/steel (smooth): 12.4
Brass/brass (smooth): 14.7
Cu/Cu (smooth): 12.9
Al/Al (smooth): 13.5
V2A/V2A (smooth): 14.5
41. 11 A/34B
Gel time or pot life per two g: 90 s 21° C.
Tensile shear strength (N/mm$^2$) after 12 RT
Steel/steel (smooth): 19.8
Brass/brass (smooth): 13.1
Cu/Cu (smooth): 16.9
Al/Al (smooth):11.5
V2A/V2A (smooth): 17.7
42. 12A/35B
Gel time or pot life per two g: 120 s 20° C.
Tensile shear strength (N/mm$^2$) after 72 h RT
Steel/steel (corundum-blasted): 31.0 Al/Al (corundum-blasted): 27.7
Steel/steel (smooth): 28.5 Al/Al (smooth): 21.7
Brass/brass (smooth): 31.7 Cu/Cu (smooth): 19.5
V2A/V2A (smooth): 32.7
43. 12A/36B
Gel time or pot life per two g: 30 s 20° C.
Tensile shear strength (N/mm$^2$) after 72 h RT
Steel/steel (corundum-blasted): 30.5 Al/Al (corundum-blasted): 26.7
Steel/steel (smooth): 30.0 Al/Al (smooth): 21.5
Brass/brass (smooth): 24.8 Cu/Cu (smooth): 20.4
V2A/V2A (smooth): 28.9
44. 13A/47B
Gel time or pot life per two g: 120 s 20° C.
Tensile shear strength (N/mm$^2$) after 72 h RT
Steel/Steel (corundum-blasted): 17.6 Al/Al (corundum-blasted): 14.0
Steel/steel (smooth): 14.6 Al/Al (smooth): 12.4
Brass/brass (smooth): 14.5 Cu/Cu (smooth): 13.1
V2A/V2A (smooth): 11.3
45. 14A/30B Gel time or pot life per two g:_s 20° C.
Tensile shear strength (N/mm²) after 72 h RT
Steel/steel (corundum-blasted):_ Al/Al (corundum-blasted):_
Steel/steel (smooth): 18.2 Al/Al (smooth): 15.7
Brass/brass (smooth): 16.2 Cu/Cu (smooth): 15.7
V2A/V2A (smooth): 13.8
46. 15A/30B
Gel time or pot life per two g:_s 20° C.
Tensile shear strength (N/mm²) after 72 h RT
Steel/steel (corundum-blasted):_ Al/Al (corundum-blasted):_
Steel/steel (smooth): 17.0 Al/Al (smooth): 16.2
Brass/brass (smooth): 14.5 Cu/Cu (smooth): 13.2
V2A/V2A (smooth): 14.9
47. 16A/30B
Gel time or pot life per two g: 90 s 20° C.
Tensile shear strength (N/mm²) after 72 h RT
Steel/steel (corundum-blasted):_ Al/Al (corundum-blasted):_
Steel/steel (smooth): 17.8 Al/Al (smooth): 15.7
Brass/brass (smooth): 15.1 Cu/Cu (smooth): 12.9
V2A/V2A (smooth): 14.9
48. 17A/37B
Gel time or pot life per two g: 540 s 22° C.
Tensile shear strength (N/mm²) after 72 h RT
Steel/steel (corundum-blasted): 31.2 Al/Al (corundum-blasted): 25.4
Steel/steel (smooth): 26.8 Al/Al (smooth): 14.2
Brass/brass (smooth): 20.4 Cu/Cu (smooth): 15.0
V2A/V2A (smooth): 24.1
49. 17A/38B
Gel time or pot life per two g: 30 s 22° C.
Tensile shear strength (N/mm²) after 72 h RT
Steel/steel (corundum-blasted): 31.7 Al/Al (corundum-blasted): 25.7
Steel/steel (smooth): 20.6 Al/Al (smooth): 14.4
Brass/brass (smooth): 19.1 Cu/Cu (smooth): 16.5
V2A/V2A (smooth): 21.3
50. 12A/39B
Gel time or pot life per two g: 165 s 22° C.
Tensile shear strength (N/mm²) after 72 h RT
Steel/steel (corundum-blasted): 26.8 Al/Al (corundum-blasted): 23.6
Steel/steel (smooth): 22.6 Al/Al (smooth): 8.0
Brass/brass (smooth): 19.4 Cu/Cu (smooth): 13.1
V2A/V2A (smooth): 21.1
51. 12A/40B
Gel time or pot life per two g: 50 s 22° C.
Tensile shear strength (N/mm²) after 72 h RT
Steel/steel (corundum-blasted): 28.7 Al/Al (corundum-blasted): 26.5
Steel/steel (smooth): 19.5 Al/Al (smooth): 4.1
Brass/brass (smooth): 20.0 Cu/Cu (smooth): 15.0
V2A/V2A (smooth): 20.1
52. 12A/41B
Gel time or pot life per two g: 175 s 22° C.
Tensile shear strength (N/mm²) after 72 h RT
Steel/steel (corundum-blasted): 21.3 Al/Al (corundum-blasted): 18.7
Steel/steel (smooth): 18.8 Al/Al (smooth): 15.0
Brass/brass (smooth): 17.5 Cu/Cu (smooth): 15.1
V2A/V2A (smooth): 17.9
53. 12A/42B
Gel time or pot life per two g: 45 s 22° C.
Tensile shear strength (N/mm²) after 72 h RT
Steel/steel (corundum-blasted): 20.5 Al/Al (corundum-blasted): 18.5
Steel/steel (smooth): 17.5 Al/Al (smooth): 8.1
Brass/brass (smooth): 19.2 Cu/Cu (smooth): 16.9
V2A/V2A (smooth): 15.1
54. 18A/43B
Gel time or pot life per two g: 900 s 21° C.
Tensile shear strength (N/mm²) after 72 h RT
Steel/steel (corundum-blasted): 24.3 Al/Al (corundum-blasted): 20.8
Steel/steel (smooth): 22.2 Al/Al (smooth): 16.1
Brass/brass (smooth):16.4 Cu/Cu (smooth): 18.3
V2A/V2A (smooth): 18.6
55. 18A/44B
Gel time or pot life per two g: 30 s 21° C.
Tensile shear strength (N/mm²) after 72 h RT
Steel/steel (corundum-blasted): 24.3 Al/Al (corundum-blasted): 22.2
Steel/steel (smooth): 23.2 Al/Al (smooth): 15.2
Brass/brass (smooth): 18.3 Cu/Cu (smooth): 16.8
V2A/V2A (smooth): 18.6
56. 19A/45B
Gel time or pot life per two g: 1200 s 20° C.
Tensile shear strength (N/mm²) after 72 h RT
Steel/steel (corundum-blasted): 29.0 Al/Al (corundum-blasted): 24.0
Steel/steel (smooth): 24.8 Al/Al (smooth): 20.8
Brass/brass (smooth): 25.3 Cu/Cu (smooth): 18.2
V2A/V2A (smooth): 24.2
57. 20A/46B
Gel time or pot life per two g: 60–70 mins. 20° C.
Tensile shear strength (N/mm²) after 72 h RT
Steel/steel (corundum-blasted): 29.3 Al/Al (corundum-blasted): 19.9
Steel/steel (smooth): 26.4 Al/Al (smooth): 21.6
Brass/brass (smooth): 23.8 Cu/Cu (smooth):_
V2A/V2A (smooth):22.1
58. 21A/48B
Gel time or pot life per two g: 80 s 20° C.
Tensile shear strength (N/mm²) after 72 h RT
Steel/steel (corundum-blasted):_ Al/Al (corundum-blasted):_
Steel/steel (smooth): 25.8 Al/Al (smooth): 19.1
Brass/brass (smooth): 22.8 Cu/Cu (smooth): 18.4
V2A/V2A (smooth): 20.3

Unless otherwise indicated, all the A/B adhesive systems tested lose their surface tackiness after 12 to 336 hours depending upon their composition, the substrates and the ambient temperature.

All the a/b adhesive systems are substantially odor-free.

What is claimed is:

1. An aerobically curable adhesive composition, comprising the product of combining
   a) a first component comprising
      i) at least one polyurethane (meth)acrylate having a boiling point above 120° C. at normal pressure;
      ii) optionally, at least one additional (meth)acrylate comonomer other than a polyurethane (meth) acrylate provided said additional (meth)acrylate comonomer has a boiling point above 120° C. at normal pressure;
      iii) at least one free radical initiator; and
      iv) at least one transition metal-free accelerator; and
   b) a second component comprising
      i) at least one polyurethane (meth)acrylate having a boiling point above 120° C. at normal pressure;
      ii) optionally, at least one additional (meth)acrylate comonomer other than a polyurethane (meth) acrylate provided said additional (meth)acrylate comonomer has a boiling point above 120° C. at normal pressure;

iii) a drier comprising at least one soluble metal salt of an organic acid having a metal component selected from the group consisting of Co, Fe, Zr, Mn, Ce, Pb, Zn, Ca, Ba, Y and combinations thereof; and iv) optionally, a transition metal accelerator selected from the group consisting of salts and complexes of copper, vanadium and nickel;

subject to the proviso that if only one soluble metal salt of an organic acid is utilized in said drier (iii), the transition metal accelerator (iv) is also utilized in the second component and wherein within 30 days of combining said first component and said second component a surface of the adhesive composition in contact with air is no longer tacky.

2. The adhesive composition of claim 1 wherein the free radical initiator is selected from the group consisting of organic hydroperoxides, peresters, peracids, and peroxides.

3. The adhesive composition of claim 1 wherein the transition-metal-free accelerator is selected from the group consisting of sulfimides, acids having a $pK_a$ value below 6, hydrazine derivatives, and tertiary amines.

4. The adhesive composition of claim 1 wherein the metal component is Co, Fe, or Zr and the organic acid is a naphthenic acid, a resinic acid, or an aliphatic carboxylic acid containing 6 tc 10 carbon atoms.

5. The adhesive composition of claim 1, further comprising one or more ingredients selected from the group consisting of dyes, inhibitors, chelators, viscosity controllers, emulsifiers and mixtures thereof.

6. The adhesive composition of claim 1 comprising at least one additional (meth)acrylate comonomer corresponding to the general formula $$H_2C=CR^1—C(=O)—O—R^2—O—C(=O)—NH—R^3$$

wherein $R^1$ is hydrogen or a methyl group, $R^2$ is a linear or branched alkyl group containing 2 to 6 carbon atoms or an alkylene oxide containing 4 to 21 carbon atoms, and $R^3$ is an acrylic group containing 6 to 18 carbon atoms, a linear or branched alkyl group containing 1 to 18 carbon atoms, or a cycloalkyl group containing 3 to 12 carbon atoms.

7. The adhesive composition of claim 1 comprising at least one additional (meth)acrylate comonomer selected from the group consisting of 2-hydroxyethylacrylate, 2-hydroxyethyl methacrylate, 2-hydroxypropylacrylate, 3-hydroxypropylacrylate, 2-hydroxypropyl methacrylate, 3-hydroxypropyl methacrylate, 3-[2-(methacryloyloxy)-ethoxy carbonyl] propionic acid, and phthalic acid mono-2methacryloyl-oxyethyl ester.

8. The adhesive composition of claim 1 wherein the polyurethane (meth)acrylate is prepared by reacting a diol with a diisocyanate to obtain a reaction product which is thereafter reacted with a hydroxy functional (meth)acrylate.

9. The adhesive composition of claim 8 wherein the diol is a polycaprolacrone diol, a polytetrahydrofurfuryl diol, or a polyester diol characterized by a C:O ratio greater than 2.6, a C:H ratio less than 10, and a molecular weight in the range of 1,000 to 20.000.

10. The adhesive composition of claim 8 wherein the diisocyanate is TDI or MDI.

11. The adhesive composition of claim 8 wherein the hydroxy functional (meth)acrylate is hydroxyethyl acrylate, hydroxyethylmethacrylate, 2-hydroxypropyl acrylate, 3-hydroxypropyl acrylate, 2-hydroxypropyl methacrylate, or 3-hydroxypropyl methacrylate.

12. An aerobically curable adhesive composition, comprising the product of combining a) a first component comprising i) at least one polyurethane (meth)acrylate having a boiling point above 120° C. at normal pressure prepared by reacting a diol with a diisocyanate to obtain a reaction product which is thereafter reacted with a hydroxy functional (meth)acrylate;

ii) at least one additional (meth)acrylate comonomer having a boiling point above 120° C. at normal pressure selected from the group consisting of 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 3-[2-(methacryloyloxy)-ethoxy carboxyl] propionic acid, and phthalic acid mono-2-methacryloyl-oxyethyl ester;

iii) at least one free radical initiator selected from the group consisting of organic hydroperoxides, peresters, peracids, and peroxides; and iv) at least one transition metal-free accelerator selected from the group consisting sulfimides, acids having a $pK_a$ value below 6, hydrazine derivatives and tertiary amines; and b) a second component comprising i) at least one polyurethane (meth)acrylate having a boiling point above 120° C. at normal pressure prepared by reacting a diol with a diisocyanate to obtain a reaction product which is thereafter reacted with a hydroxy functional (meth)acrylate;

ii) at least one additional (meth)acrylate comonomer having a boiling point above 120° C. at normal pressure selected from the group consisting of 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 3-[2-(methacryloyloxy)-ethoxy carboxyl] propionic acid, and phthalic acid mono-2-methacryloyl-oxyethyl ester;

iii) a drier comprising at least one soluble metal salt of an organic acid which is a Co, Fe or Zr salt of a nahthenic acid, resinic acid or aliphtic carboxylic acid containing 6 to 10 carbon atoms; and iv) optionally, a transition metal accelerator which is a salt or complex of copper, vanadium or nickel;

subject to the proviso that if only one soluble metal salt of an organic acid is utilized in said drier (iii), the transition metal accelerator (iv) is also utilized in the second component, and wherein with 30 days of combining said first component and said second component a surface of the adhesive composition in contact with air is no longer tacky.

13. The adhesive composition of claim 12 wherein the free radical initiator is cumene hydroperoxide.

14. The adhesive composition of claim 12 wherein the transition-metal-free accelerator is selected from the group consisting of tributylamine, saccharine, p-toluene sulfonic acid hydrazide, N,N-dimethyl-p-toluidine, ethoxylated p-toluidine, and 1-acetyl-2phenyl hydrazine.

15. The adhesive composition of claim 12 wherein the transition metal accelerator is selected from the group consisting of copper octoate, copper naphthenate, copper ethyl hexanoate, copper acetate and copper acetyl acetonate.

16. The adhesive composition of claim 12 containing the transition metal accelerator in a quantity of 0.1 to 1% by weight based on the quantity of polyurethane(meth)acrylate and additional (meth)acrylate comonomer.

17. The adhesive composition of claim 12 wherein the soluble metal salt of an organic acid is selected from the group consisting of $Co^{2+}$, $Fe^{2+}$, and $Zr^{2+}$ ethyl hexanoates and naphthenates.

18. The adhesive composition of claim 12 wherein the drier is used in a concentration of 1 to 6% by weight, based on the quantity of polyurethane (meth)acrylate and additional (meth)acrylate comonomer.

19. The adhesive composition of claim 12, further comprising one or more ingredients selected from the group consisting of dyes, inhibitors, chelators, viscosity controllers, emulsifiers and mixtures thereof.

20. The adhesive composition of claim 12 wherein the diol is a polycaprolactone diol, a polytetrahydrofurfuryl diol, or a polyester diol characterized by a C:O ratio greater than 2.6, a C:H ratio less than 10, and a molecular weight in the range of 1,000 to 20,000.

21. The adhesive composition of claim 12 wherein the diisocyanate is TDI or MDI.

22. The adhesive composition of claim 12 wherein the hydroxy functional (meth)acrylate is hydroxyethyl acrylate, hydroxyethyl methacrylate, 2-hydroypropyl acrylate, 2-hydroxypropylmethacrylate, 3-hydroxypropyl acrylate, or 3-hydroxypropylmethacrylate.

* * * * *

UNITED STATES PATENT AND TRADEMARK OFFICE
CERTIFICATE OF CORRECTION

PATENT NO. : 6,096,842
DATED : August 1, 2000
INVENTOR(S) : Friese et al.

It is certified that error appears in the above-identified patent and that said Letters Patent is hereby corrected as shown below:

Column 25,
Line 13, after "nent", and before "and", insert -- , --.
Line 26, delete "tc", and insert therefor -- to --.
Line 49, delete "2methacryloyl-oxyethyl", and insert therefor
-- 2-methacryloyl-oxyethyl --.
Line 55, delete "polycaprolacrone", and insert therefor -- polycaprolactone --.
Line 58, delete "20.000", and insert therefor -- 20,000 --.

Column 26,
Line 41, delete "nahthenic", and insert therefor -- naphthenic --.
Line 57, delete "1-acetyl-2phenyl", and insert therefor -- 1-acetyl-2-phenyl --.
Line 64, after "weight", insert -- , --.

Column 28,
Line 8, delete "2-hydroypropyl", and insert therefor -- 2-hydroxypropyl --.

Signed and Sealed this

Thirtieth Day of September, 2003

JAMES E. ROGAN
*Director of the United States Patent and Trademark Office*